United States Patent
Takeuchi et al.

(10) Patent No.: US 6,504,668 B1
(45) Date of Patent: Jan. 7, 2003

(54) DISK DRIVE HAVING IMPROVED RUNOUT-ERROR COMPENSATION, AND METHOD THEREFOR

(75) Inventors: Kenji Takeuchi, Atlanta, GA (US); Craig Smith, Berkeley, CA (US)

(73) Assignee: Iomega Corporation, Roy, UT (US)

( * ) Notice: Subject to any disclaimer, the term of this patent is extended or adjusted under 35 U.S.C. 154(b) by 0 days.

(21) Appl. No.: 09/307,989

(22) Filed: May 10, 1999

(51) Int. Cl.[7] .............................................. G11B 5/596
(52) U.S. Cl. ................................................... 360/77.04
(58) Field of Search ......................... 360/77.01, 77.02, 360/77.03, 77.08, 25, 31, 77.04; 369/43, 44.11, 44.34

(56) References Cited

U.S. PATENT DOCUMENTS

| | | | |
|---|---|---|---|
| 4,594,622 A | 6/1986 | Wallis | 360/77.04 |
| 4,628,379 A | 12/1986 | Andrews, Jr. et al. | 360/77.05 |
| 5,550,685 A | 8/1996 | Drouin | 360/77.08 |
| 5,585,976 A | 12/1996 | Pham | 360/77.04 |
| 5,926,338 A * | 7/1999 | Jeon et al. | 360/77.04 |
| 6,049,441 A * | 4/2000 | Ottesen | 360/77.04 |
| 6,088,186 A * | 7/2000 | Carlson | 360/44.32 |
| 6,097,565 A * | 8/2000 | Sri-Jayantha et al. | 360/78.09 |
| 6,141,175 A * | 10/2000 | Nazarian et al. | 360/77.04 |
| 6,304,420 B1 * | 10/2001 | Murphy et al. | 360/245.7 |
| 6,310,739 B1 * | 10/2001 | McEwen et al. | 360/25 |

* cited by examiner

Primary Examiner—David Hudspeth
Assistant Examiner—Mitchell Slavitt
(74) Attorney, Agent, or Firm—Woodcock Washburn LLP (57) ABSTRACT

A disk drive has a servo controller that compensates for repeatable runout between the drive's data-transducing head and a data-storage disk disposed within the drive. The drive incorporates an improved runout-compensation technique by which a runout-error correction is applied to a plurality of locations on the disk without a need to store position-error data corresponding to each location. The drive also incorporates an improved runout-compensation technique by which the runout-error correction is optimally matched to the response characteristics of the drive's actuator mechanism. This optimal matching is accomplished by setting the anticipation interval for the correction in non-whole-sector increments, and calculating a to-be applied runout-error correction. Alternatively, the drive is equipped with a digital filter that calculates a runout-error correction based on a model of the actuator mechanism incorporated into the filter.

12 Claims, 8 Drawing Sheets

DISK DRIVE HAVING IMPROVED RUNOUT-ERROR COMPENSATION, AND METHOD THEREFOR

BACKGROUND OF THE INVENTION

Digital information is commonly stored on data-storage disks. Data-storage disks are used in conjunction with some type of disk drive that is adapted to rotate the disk. Data-storage systems typically comprise a data-transducing head that reads and/or writes information to and from the disk surface as the disk rotates. For example, the data-transducing head may be a magnetoresistive read/write head adapted for use with a magnetic-media disk. Alternatively, the data-transducing head can be an optical sensor that registers the reflection of a beam of light from the surface of an optical disk. Unless otherwise noted, the term "data-transducing head," as used throughout the specification and claims, refers collectively to these various types of transducers.

The data-transducing head is usually coupled to an actuator mechanism. The actuator mechanism positions the data-transducing head proximate the surface of the data disk. Furthermore, the actuator moves the head across the disk surface, thereby allowing the head to store and retrieve data to and from various locations on the disk surface. Movement of the actuator is usually regulated by way of a control input generated by a servo controller.

The digital information on a data disk is usually stored in series of continuous tracks arranged concentrically about the geometric center of the disk. Accurate storage and retrieval of information to and from a particular track requires that the data-transducing head be positioned in the center of the track during read/write operations. Closed-loop servo controllers are commonly used to maintain the required alignment between the head and the data track. One particular type of closed-loop servo controller relies on the use of so-called embedded servo sectors. An embedded servo sector comprises a grouping of servo information stored, or embedded, within the concentric data tracks on the disk surface. More particularly, servo information is stored in the form of burst patterns positioned in constantly-spaced intervals along the data track. Hence, each data track contains a series of servo sectors used for directional guidance of the data-transducing head, and a series of data sectors utilized by the disk user to store information.

The process of maintaining the data-transducing head over the track centerline is called track following. The prerecorded servo information on the disk surface is sensed by the head during track-following operations. The information is demodulated to generate a grey code that contains track and sector-identification information. The servo information is also used to generate a tracking-error signal. The error signal is a function of the offset between the head and the track centerline. The grey code and the tracking-error signal are input to a central processing unit (CPU). The CPU performs a series of calculations and generates a compensation signal. The compensation signal directs the actuator mechanism to move the head toward the centerline of the data-storage track. This closed control loop is typically referred to as the primary servo loop of the disk drive.

A number of factors can cause the data-transducing head to deviate from the data-track centerline. One such factor is the so-called repeatable runout of the data-storage disk. Repeatable runout is typically a major component of the tracking error. Runout is caused by the presence of an offset between the center of rotation of the disk and the center of the data track. Such an offset can be caused by the disk drive system, e.g., by an unbalanced spindle or a non-ideal bearing. An offset can also result from imperfections in the disk itself, e.g., misalignment between the axis of rotation of the disk and the center of a data track. If not corrected, repeatable runout will produce a tracking error that varies in a repetitive manner, e.g., sinusoidally, with a frequency corresponding to the angular velocity of the disk (or even multiples thereof).

The repetitive nature of repeatable runout makes it feasible to compensate for such runout using techniques independent of the above-noted primary servo loop. For example, a correction generated by a secondary control loop within the servo controller can be implemented based on runout values determined during prior revolutions of the data-storage disk. Compensating for the runout error in this manner enhances the track-following accuracy of the data-transducing head. The use of previously-determined error values, however, requires memory space in which to store the values. Increased memory requirements typically increase the complexity, size, and cost of the disk drive system, and may decrease the speed at which the system can store and retrieve information. Thus, a compensation technique for repeatable runout that requires a minimal amount of memory space is highly desirable.

The actuator mechanism of a disk drive requires a finite amount of time to respond to the control inputs that regulate its position. The response time is a function of the dynamic characteristics of the actuator, as well as the characteristics of the to-be-applied correction. Hence, where possible, control inputs are typically provided to the actuator in advance of the point at which the actual head-position correction is required. Runout compensation values, as noted above, can be pre-determined due to the repetitive nature of repeatable runout. Thus, runout-compensation values are typically input to the actuator mechanism in advance of the point at which the corresponding head-position correction is needed. The interval by which the runout-compensation value is advanced is hereinafter referred to as an "anticipation interval." Optimally, the anticipation interval is equal to the response time of the actuator mechanism. Hence, under optimal circumstances, the position of the head is physically adjusted, i.e., corrected, as the location on the data track corresponding to the correction passes the head.

The anticipation interval is usually set at a value corresponding to a particular number of servo sectors. In other words, for an anticipation interval equal to "$n_1$" servo sectors, the runout-compensation correction is input to the actuator mechanism $n_1$ servo-sectors in advance of the particular location on the disk to which the correction corresponds. Furthermore, the anticipation interval is typically set in whole-sector increments. Limiting the anticipation interval to whole-sector increments, however, produces less-than-optimal results where the response time of the actuator mechanism does not correspond to a whole-sector increment. In such cases, the anticipation interval must be set in increments other than whole sectors in order to produce optimal tracking by the data-transducing head. Hence, a disk drive that can operate with an anticipation interval that does not necessarily correspond to a whole number of servo sectors is highly desirable.

The present invention is directed to the above-mentioned goals.

SUMMARY OF THE INVENTION

The present invention provides a disk drive with improved repeatable runout compensation. The disk drive is adapted for use with a rotatable data-storage disk having a plurality of servo sectors embedded along a data track on the disk. The disk drive comprises an actuator mechanism. The drive also comprises a data-transducing head that reads position-error data from the servo sectors. The data-transducing head is mechanically coupled to the actuator. The drive further comprises a servo controller electrically coupled to the data-transducing head and the actuator mechanism.

The servo controller stores the above-noted position-error data from a selected group of servo sectors. The selected group of servo sectors is lesser in number than the plurality of servo sectors embedded along the data track on the disk. The controller generates a plurality of runout-error corrections based on this data. The plurality of runout-error corrections are greater in number than the selected group of servo sectors. The servo controller adjusts the position of the actuator mechanism based on the plurality of runout-error corrections. The controller thereby compensates for repeatable runout between the data-transducing head and the disk.

The invention also provides a method for providing improved runout compensation in a disk drive. The method comprises the step of reading position-error data from servo sectors embedded along a data track of a data-storage disk disposed within the drive. The method further comprises the step of storing position-error data from a selected group of servo sectors. The selected group of servo sectors is lesser in number than the plurality of servo sectors embedded along the data track on the disk. The method also comprises the step of generating a plurality of runout-error corrections based on the position-error data from the selected group of servo sectors. The plurality of runout-error corrections are greater in number than the selected group of servo sectors. The method also comprises the step of adjusting the position of an actuator mechanism mechanically coupled to the data-transducing head based on the plurality of runout-error corrections.

Another embodiment of the invention provides a disk drive that is adapted to operate with an anticipation interval having an integer portion and a fractional portion. The drive comprises an actuator mechanism. The drive further comprises a data-transducing head mechanically coupled to the actuator. The head reads position-error data and a servo-sector number from servo sectors embedded along a data track of a data-storage disk. The drive also comprises a servo controller electrically coupled to the data-transducing head and the actuator mechanism. The servo controller comprises a memory array.

The servo controller stores and indexes position-error data from a first servo sector in a first location in the memory array. The controller also reads position-error data from a second location in the memory array. The second location corresponds to the number of the first servo-sector plus the integer portion of the anticipation interval. Furthermore, the controller reads position-error data from a third location in the array. The third location is adjacent to the second location. The controller interpolates a runout-error correction based on the position-error data from the second and third array locations, and a fractional portion of the anticipation interval. The controller adjusts the position of the actuator mechanism based on the interpolated runout-error correction, thereby compensating for repeatable runout between the data-transducing head and the data-storage disk.

The invention also provides a method for compensating for repeatable runout in a disk drive that is adapted to operate with an anticipation interval having an integer portion and a fractional portion. This method comprises the step of reading position-error data and a servo-sector number from a first servo sector embedded in a data track of a data-storage disk. The method also comprises the step of storing and indexing the position-error data in a first location in a memory array. The method further comprises the step of reading position-error data from a second location in the memory array. The second location corresponds to the number of the first servo sector plus an integer portion of the anticipation interval. The method also comprises the step of reading position-error data from a third location in the memory array. The third location is adjacent to the second location. The method further comprises the step of interpolating a runout-error correction based on the position-error data from the second and third locations and the fractional portion of the anticipation interval. The method further comprises the step of adjusting the position of an actuator mechanism coupled to the data-transducing head based on the runout-error correction.

A further embodiment of the invention provides a disk drive in which improved runout-error compensation is achieved through the use of a digital filter. The drive comprises an actuator mechanism. The drive further comprises a data-transducing head mechanically coupled to the actuator. The head reads position-error data and a servo-sector number from servo sectors embedded along a data track of a data-storage disk. The drive also comprises a servo controller electrically coupled to the data-transducing head and the actuator mechanism. The servo controller comprises a memory array bearing a set of computer-executable instructions. The instructions comprise an $n_{th}$-order digital filter.

The servo controller stores and indexes position-error data from a first servo sector in a first location in the memory array. The servo controller also reads position-error data from locations in the memory array corresponding to the first servo sector, a second servo sector having a sector number equal to the number of the first servo sector minus n, and servo sectors having sector numbers between the sector numbers of the first and second servo sectors. The controller inputs this position-error data to the digital filter, and calculates a runout-error correction using the digital filter. The controller adjusts the position of the actuator mechanism based on the runout-error correction, thereby compensating for repeatable runout between the data-transducing head and the data-storage disk.

The invention also provides a method for compensating for repeatable runout between a data-transducing head and a data-storage disk through the use of digital filter. The method comprises the step of reading position-error data and a servo-sector number from a first servo sector embedded in a data track of a data disk. The method also comprises the step of storing and indexing the position-error data in a first location in a memory array. The method further comprises the step of reading position-error data from locations in the memory array corresponding to the first servo sector, a second servo sector having a sector number equal to the number of the first servo sector minus n, and servo sectors having sector numbers between the sector numbers of the first and second sectors. Additionally, the method comprises the steps of inputting this position-error data to the digital filter, and calculating a runout-error correction using the digital filter. The method further comprises the step of adjusting the position of the actuator mechanism based on the runout-error correction.

BRIEF DESCRIPTION OF THE DRAWINGS

The foregoing summary, as well as the following detailed description of the preferred embodiment, is better understood when read in conjunction with the appended drawings. For the purpose of illustrating the invention, the drawings show an embodiment that is presently preferred. The invention is not limited, however, to the specific instrumentalities disclosed in the drawings. In the drawings.

DESCRIPTION OF PREFERRED EMBODIMENTS

A preferred embodiment of the invention is illustrated in FIGS. 1 through 8. The invention provides a disk drive 10 adapted for use with a rotatable data-storage disk 12. The data disk 12 of the exemplary embodiment is a removable, hard, magnetic-type medium. The invention is equally applicable, however, to non-removable and floppy-type media. Furthermore, the invention can be used in conjunction with optical as well as magnetic media.

Figure 1:
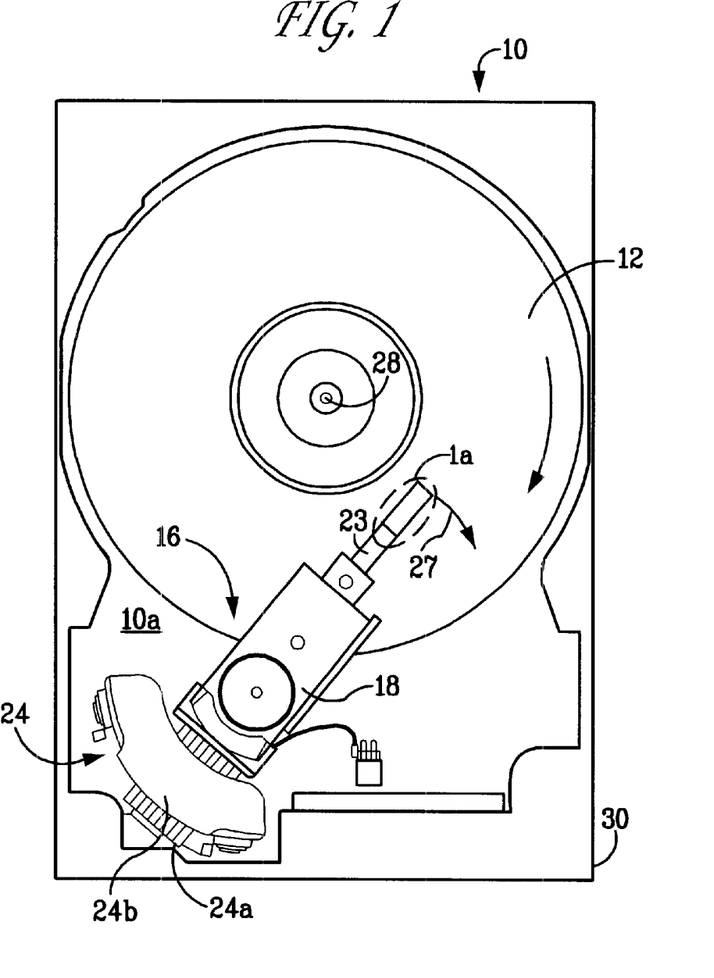
FIG. 1 is a top view of a disk drive adapted for use with the present invention.

The disk drive 10 comprises a magnetoresistive read/write head 14. This particular type of data-transducing head is illustrated for exemplary purposes only, as the invention can readily be used in conjunction with other types of read/write and read-only heads.

Figure 1A:
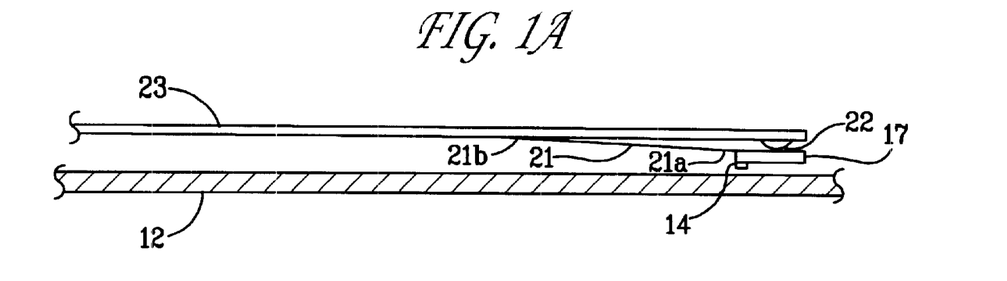
FIG. 1A is a magnified side view of the area 1A of FIG. 1.

The head 14 is coupled to an actuator mechanism 16. More particularly, the head 14 is affixed to an air-bearing slider 17 that, in turn, is affixed to the actuator 16. The actuator 16 comprises an actuator arm 18, a flexure 21, a gimbal 22, and a suspension arm 23. The slider 17 is affixed to a first end 21a the flexure 21. An opposite end 21b of the flexure 21 is affixed to the suspension arm 23. . The slider 17 and the head 14 are thereby suspended from the flexure 21 below the arm 23. The gimbal 22 is affixed to the suspension arm 23 directly above the slider 20, i.e., the gimbal 22 is located between the flexure 21 and the slider 17. The suspension arm 23 is affixed to the actuator arm 18. The actuator arm 18 is pivotally coupled to an internal surface 10a of the drive 10.

The exemplary embodiment comprises one read/write head 14, and is adapted for operation with a single disk 12. This configuration is shown for illustrative purposes only, as the invention is equally applicable to drives 10 that are adapted for operation with multiple disks 12. Furthermore, the invention can be used in conjunction with drives 10 that comprise two heads 14 disposed on opposite sides of the disk 12.

The slider 17 is positioned proximate a surface of the disk 12 during read/write operations within the drive 10. The rotation of the disk 12 produces an aerodynamic boundary layer on the surface of the disk 12. An interaction between the slider 17 and the boundary layer produces a lifting force that urges the slider 17 (and the head 14) away from the disk 12. The lifting force drives the slider 17 into contact with the gimbal 22. The slider 17 contacts the gimbal 22 at a pivot point (not shown) on a surface of the slider 17. The resilient suspension arm 23, by way of the gimbal 22, thereafter exerts a spring force on the slider 17 that counteracts the lifting force. The slider 17 eventually reaches a height above the disk 12 at which the counteracting lift and suspension-arm forces are balanced. This height represents the flying height of the slider 17.

The gimbal 22 and the flexure 21 allow the slider 17 and the head 14 to undergo a limited amount of movement in relation to the suspension arm 23. Specifically, the slider 17 and the head 14 can move vertically as noted above. Furthermore, the slider 17 and the head 14 can undergo a limited degree of rotation about the pitch and roll axes of the slider 17, i.e., about a laterally-oriented axis and a longitudinally-oriented axis that each pass through the pivot point of the slider 17.

The actuator 16 further comprises an actuator motor 24. The motor 24 is a voice-coil motor comprising a movable coil 24a and a fixed permanent-magnet assembly 24b. The coil 24a is pivotally disposed within the magnetic field produced by the assembly 24b. The coil 24a is mechanically coupled to the actuator arm 18. The coil 24a is electrically coupled to a central processing unit (CPU) 26. The CPU 26 selectively directs electrical current through the coil 24a, thereby causing the motor 24 to generate a torque. This torque drives the coil 24a through the magnetic field created by the assembly 24b. Movement of the coil 24a, in turn, causes the arm 18 to pivot about its coupling point with the drive surface 10a. This pivoting motion produces a force on the suspension arm 23 which, in turn, causes the head 14 to translate along an arcuate path 27 over the surface of the disk 12. Although the drive 10 is described as comprising a voice-coil motor and a pivoting actuator arm 18, the invention is equally applicable to drives 10 that utilize a stepper-type motor and a linearly-translating actuator arm 18.

The drive 10 also comprises a spindle motor (not shown) that rotates the data-storage disk 12, and a spindle 28 through which the rotational torque of the spindle motor is transmitted to the disk 12. The various components of the drive 10 are enclosed within an outer casing 30.

Figure 2:
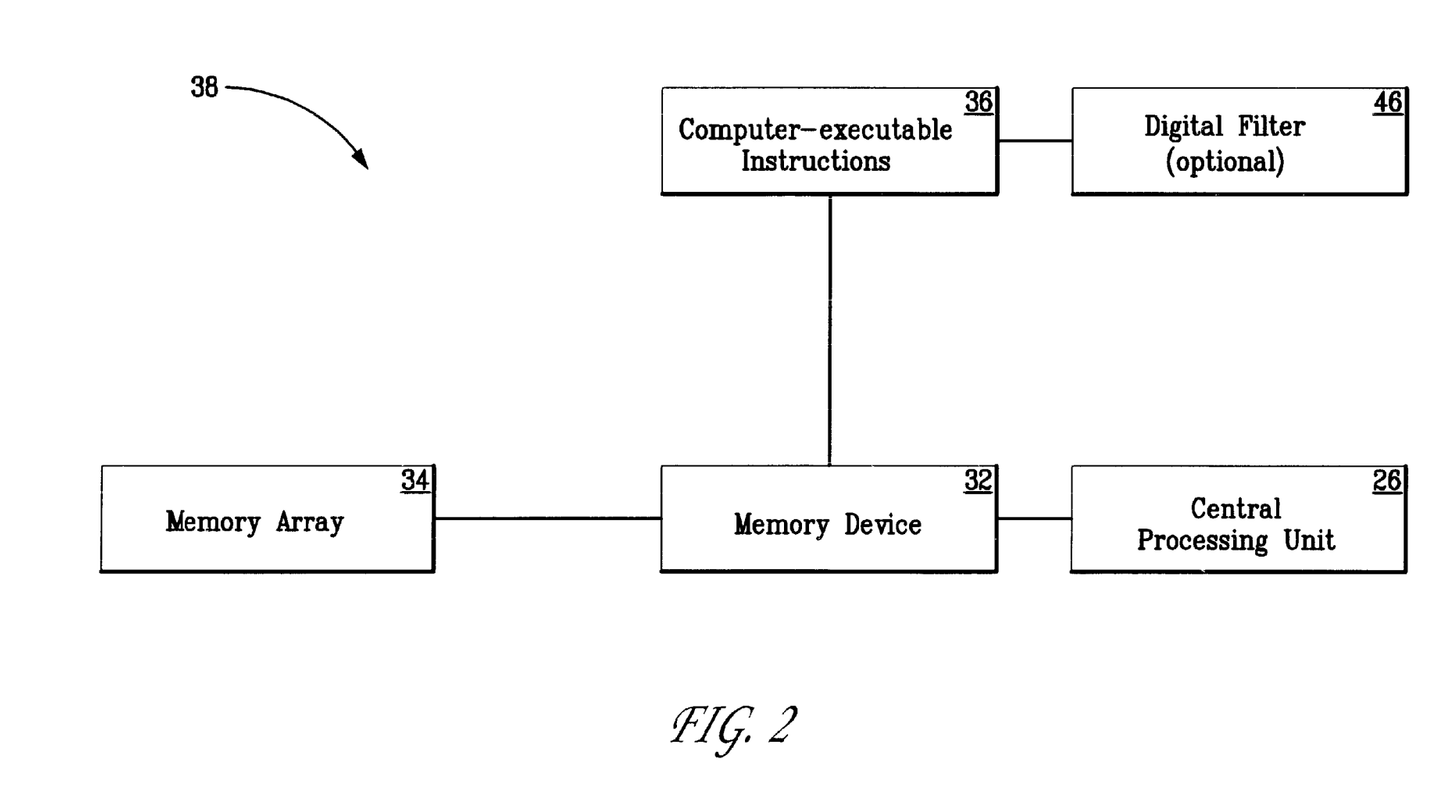
FIG. 2 is a diagrammatic illustration of a servo control system of the disk drive of FIG. 1.

The drive 10 also comprises a memory device 32, a memory array 34, and a set of computer-executable instructions 36. The array 34 and the instructions 36 are stored on the memory device 32. The memory device 32 may be a RAM, ROM, PROM, EPROM, or similar chip or chip set. Alternatively, the memory device 32 may be a chip or chip set having registers for storing information. The memory device 32, memory array 34, instructions 36, and CPU 26 form a servo controller 38, as shown in FIG. 2.

Figure 3:
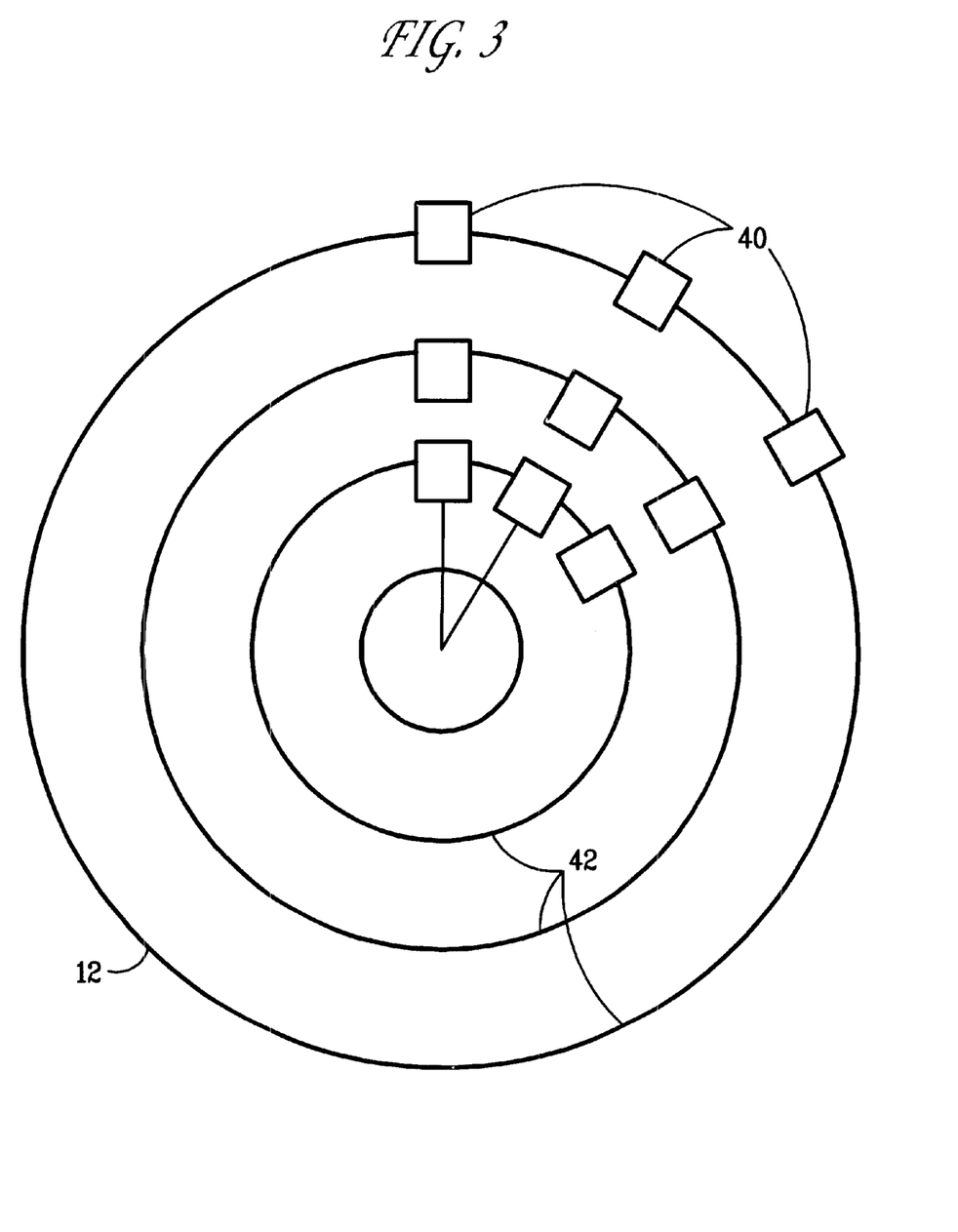
FIG. 3 is a diagrammatic illustration of a data-storage disk adapted for use with the disk drive of FIG. 1.

The servo controller 38 is adapted for use with a series of servo sectors 40. The servo sectors 40 are embedded in equally-spaced intervals along a plurality of data tracks 42 on the data-storage disk 12, as illustrated in FIG. 3. The exemplary disk 12 comprises a total of 80 servo sectors 40 per data track 42. The servo sectors 40 on each data track 42 are arranged in identical circumferential, i.e., clock, positions with respect to the sectors 40 on the other tracks 42. Sectors 40 that share a common circumferential position (on different data tracks 42) are assigned the same servo-sector number. For clarity, a limited number of sectors 40 and tracks 42 are shown in FIG. 3. Furthermore, the sectors 40 and the tracks 42 are not drawn to scale.

The servo controller 38 comprises a primary servo loop 38a as described in the Background of the Invention. The controller 38 also comprises a secondary control loop 38b that compensates for the repeatable runout between the head 14 and the disk 12. More particularly, the computer-executable instructions 36 that form the secondary control loop 38b instruct the CPU 26 to regulate the position of the actuator mechanism 16 in a manner that compensates for the repeatable runout.

One aspect of the invention is directed to minimizing the amount of memory space required to implement the runout-error correction generated by the controller 38. More specifically, the invention provides a runout-compensation technique in which a runout-error correction is applied to every servo sector 40 without the need to store position-error data for each sector 40. A second aspect of the invention is also directed to an improved runout-compensation technique. This technique allows the runout-error correction to be tailored to the response characteristics of the actuator mechanism 16, thereby optimizing the tracking accuracy of the read/write head 14.

Figure 4:
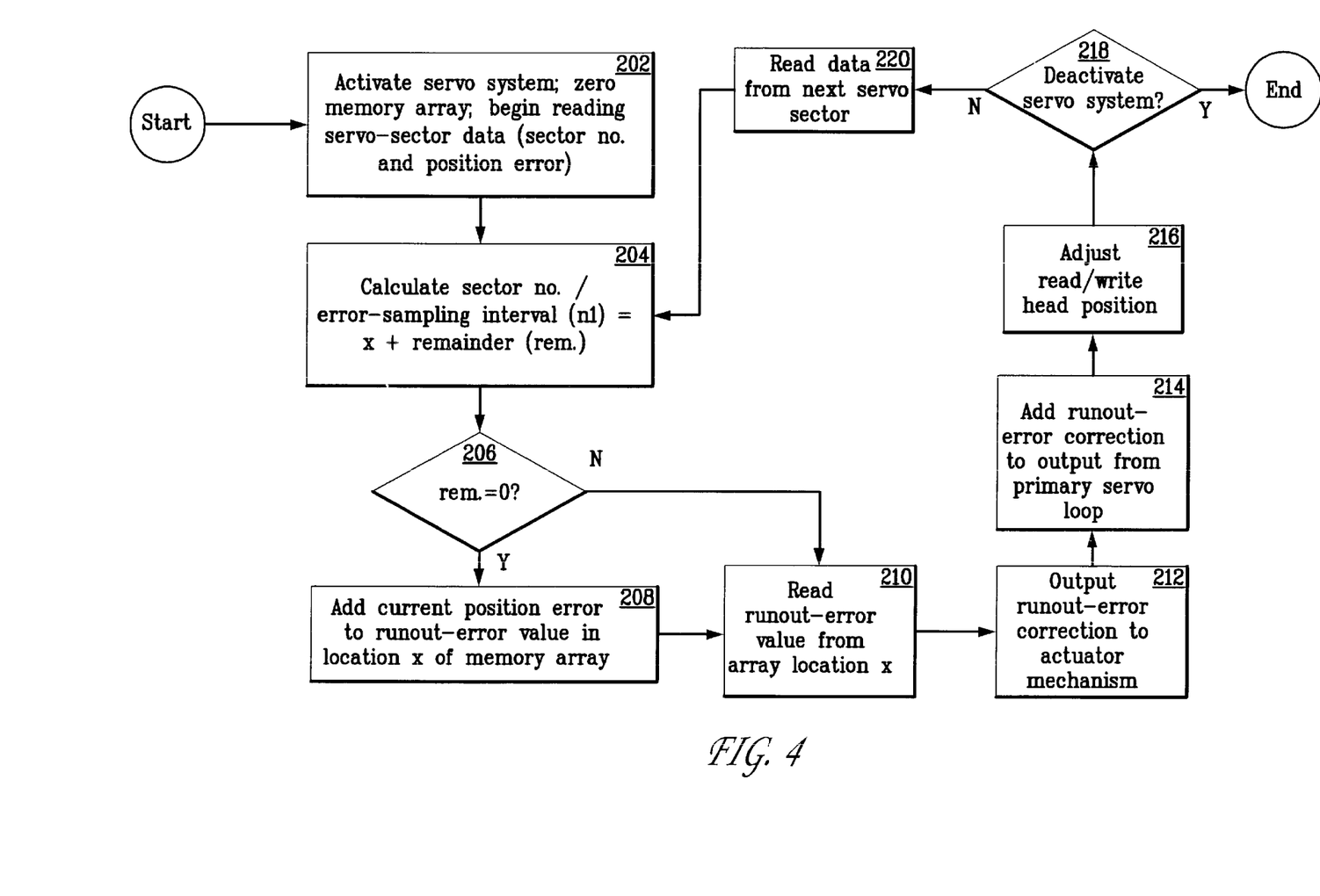
FIG. 4 is a flow diagram of an improved runout-compensation technique for use in the disk drive of FIG. 1.

An embodiment of one aspect of the invention is illustrated in the form of a flow diagram in FIG. 4. This particular embodiment provides a runout-compensation technique that requires a minimal amount of memory space within the disk drive 10. Referring to FIG. 4, the servo control system 38 begins reading data from the servo sectors 40 upon activation of the servo controller 38 (step 202). More specifically, the read/write head 14 reads the sector number and the position-error data associated with each servo sector 40 as the sector 40 passes the head 14 (the servo sector 40 from which data has most recently been acquired by the read/write head 14 is hereinafter referred to as the "current" servo sector 40).

The sector number and position-error data from the current servo sector 40 are output from the head 14 to the CPU 26. The instructions 36 next determine whether the runout-error data from the current servo sector 40 will be processed and stored for subsequent use. The instructions 36 store the runout-error data from a subset of the total number of servo sectors 40. More particularly, the instructions 36 store the error data from a series of equally-spaced sectors 40. The spacing interval between these sectors 40 is hereinafter referred to as the "error-sampling interval," or "$n_1$." The error-sampling interval in the exemplary embodiment is equal to four. Hence, the exemplary controller 38 stores data from every fourth servo sector 40. This interval is used for exemplary purposes only, as any value less that the total number of sectors 40 per data track 42 (including non-integer values) may be utilized as the error-sampling interval.

The calculation to determine whether the data from a particular sector 40 will be stored can be performed, for example, in the manner shown in steps 204 and 206 of FIG. 4. Specifically, the servo sector number is divided by the error-sampling interval $n_1$ (step 204). The resulting quotient is characterized as an integer "x" and a fractional remainder. A remainder equal to zero indicates that a particular servo sector 40 is part of a series of sectors 40 that includes sector number zero and every subsequent $n_1$ sectors 40. Hence, the instructions 36 store the data from a particular sector 40 upon determining that the quotient of the sector number and the error-sampling interval consists of an integer value with no remainder (steps 206, 208). Conversely, if the noted quotient comprises a finite remainder, the instructions 36 will not store the data from that particular sector 40 (step 206). For example, dividing sector numbers 0, 4, and 8 by four will produce a quotient with a remainder of zero. Dividing sector numbers 1, 2, 3, 5, 6, and 7 by four will yield a quotient having a finite remainder. Hence, in the exemplary embodiment, the runout-error data from sector numbers 0, 4, and 8 will be stored, while error data from sector numbers 1, 2, 3, 5, 6, and 7 will not.

Upon identifying a particular servo sector 40 as part of the above-noted series, the controller 38 stores the position-error data from that sector 40 (step 208). More particularly, the instructions 36 generate a position-error value which is stored in the array 34. The position-error value is generated by integrating the position-error from the current sector 40 with prior position-errors measured at that same sector number. The noted integration is accomplished by adding the current value for the position error to a previously-stored value in the array 34. The previously-stored value represents a sum of the position-error values measured at that particular sector number during prior revolutions of the disk 12. The integrated position-error value for a particular sector 40 thus represents a sum of all the position errors measured at that sector number since the servo-controller 38 was last activated.

The position-error value for each servo sector 40 in the above-noted series is indexed in a manner that relates the position-error value to a particular sector 40. Specifically, the position-error value for each sector 40 in the series is stored in a location in the array 34 equal to the value for x at that particular sector 40. Because x is a function of the servo sector number, the position-error value is indexed to a particular servo sector 40 by virtue of its location in the array 34. For example, the position-error value for sector number 44 is stored in location number eleven in the array 34 of the exemplary embodiment.

As is evident from the above discussion, the memory array 34 will eventually contain a number of position-error values equal to the number of servo sectors 40 per data track 42 divided by the error sampling interval $n_1$. Hence, in the exemplary embodiment, the memory array 34 will require 20 locations, as opposed to the 80 locations (one for each servo sector) required when prior-art runout-compensation techniques are utilized.

The instructions 36 generate a to-be-applied runout-error correction based on the position-error values stored in the array 34 (step 210). As is shown in FIG. 4, the controller 38 of this particular embodiment generates a runout-error correction by reading a position-error value from the array 34. More particularly, the controller 38 reads a position-error value each time a servo sector 40 passes the read/write head 14. The controller 38 subsequently applies the position-error value to the actuator mechanism 16 as a runout-error correction. Furthermore, the controller 38 reads a position-error value from the same location in the array 34 during the passage of $n_1$ consecutive sectors 40 past the head 14. The position-error value for a particular array location is only updated once, however, during this sequence. Hence, the same position-error value will applied as a runout-error correction during the passage of $n_1$ consecutive sectors 40 past the head 14. For example, in the described embodiment, the same runout-error correction will be applied to four consecutive servo sectors 40. This feature enables the controller 38 to apply a runout-error correction to each servo sector 40 along a data track 42 without the need to store. a separate position-error value for each sector number. The significant advantages provided by this feature are discussed in detail below.

The runout-error correction is output by the CPU 26 as an electrical signal. This signal is output to the actuator mechanism 16 (step 212). For clarity, the exemplary embodiment does not utilize an anticipation interval, i.e., the runout-correction signal is not output in advance of the point at which the physical correction to the position of the read/write head 14 is required. This aspect of the invention is fully applicable, however, to drives 10 that operate with an anticipation interval.

Before reaching actuator mechanism 16, the runout-correction signal is added algebraically to a correction signal generated by the primary servo loop 38a (step 214). The combined signal is subsequently input to the motor 24 of the actuator mechanism 16. The motor 24 responds to the signal by moving the actuator arm 18 so as to position the read/write head 14 closer to the center of the data track 42 (step 216). The above-noted process is repeated as subsequent servo sectors 40 pass the read/write head 14, until the servo system 38 is deactivated (steps 218, 220).

One skilled in the art will recognize that numerous variations of the above-described embodiment are possible within the contemplated scope of the invention. For example, the error-sampling interval $n_1$ can be reduced if closer tracking between the head 14 and the data track 42 is required. Conversely, the error-sampling interval can be increased where a lower tracking accuracy is tolerable. Increasing the error-sampling interval will lower the memory requirements of the controller 38. Alternatively, an iterpolative technique can be implemented to enhance the tracking accuracy of the drive 10 with no increase in memory requirements.

Figure 5:
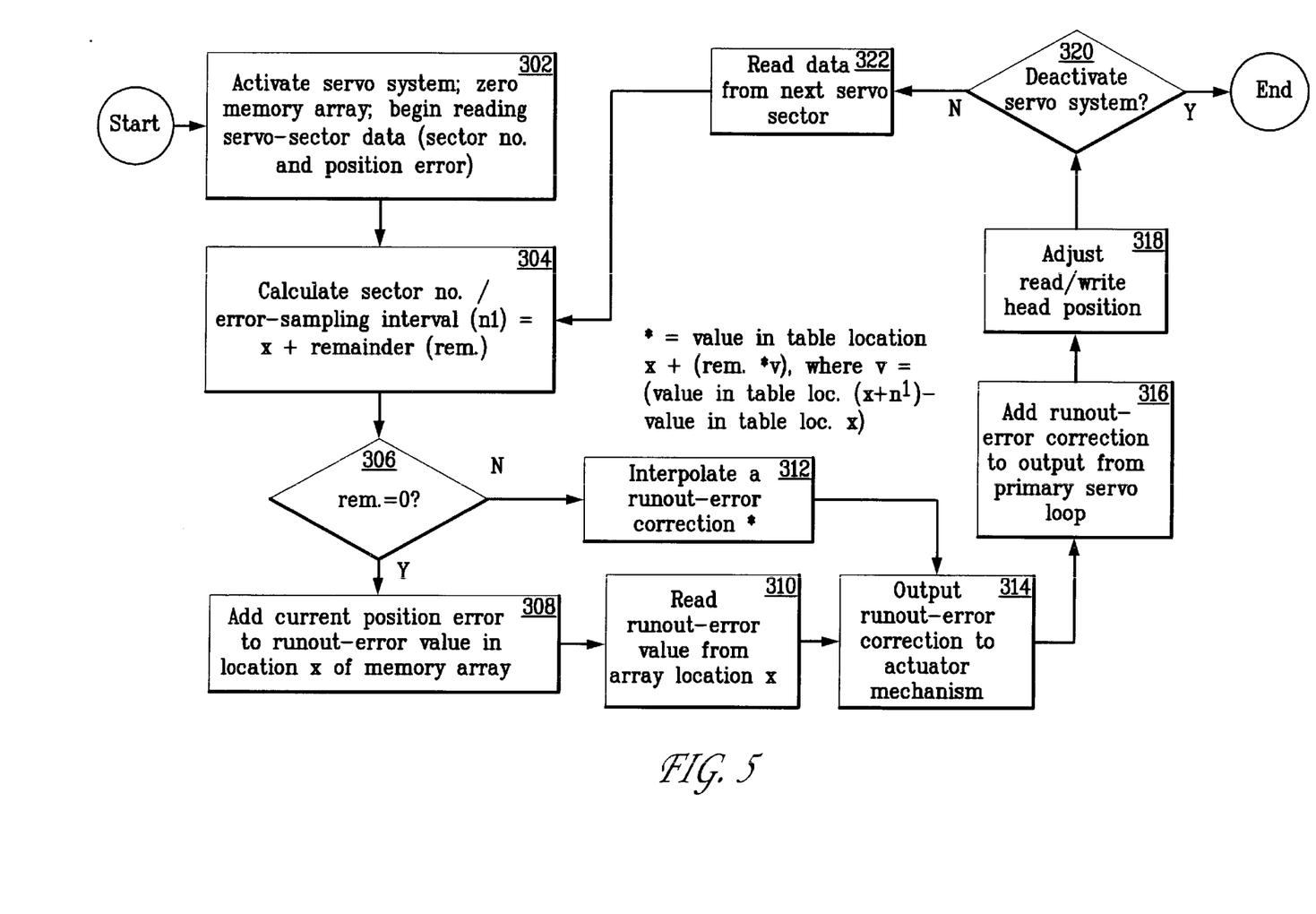
FIG. 5 is a flow diagram of an improved runout-compensation technique for use in the disk drive of FIG. 1.

An embodiment that generates runout-error corrections using an interpolative technique is illustrated in the form of a flow diagram in FIG. 5. Referring to FIGS. 4 and 5, steps 302 through 310 of the interpolating embodiment are identical to steps 202 through 210 of the previously-described embodiment, i.e., the position-error data from every sector 40 in a series of equally-spaced sectors 40 is processed and the resulting position-error value is stored in the array 34. The primary difference between the two techniques arises when the interpolating embodiment encounters a servo sector 40 that is not part of the above-noted series, i.e., when the logic block of step 306 is a "no." At this point, instead of drawing a position-error value from the same location in the array 34 from which the previously-applied position-error value was drawn, the controller 38 performs a linear interpolation (step 312). Specifically, the controller 38 interpolates between the position-error values stored in table locations x and (x+1), where x again represents the integer portion of the quotient of the sector number and the error-sampling interval $n_1$.

The interpolating embodiment thus approximates a runout-error correction for sectors 40 for which a position-error value was not stored in the array 34. The use of an approximation, as opposed to applying a correction based directly on a position-error value for a different sector 40, will typically enhance the track-following accuracy of the controller 38 in relation to a non-interpolating embodiment. Furthermore, the interpolating embodiment provides this accuracy while utilizing a number of memory locations which is less than the total number of servo sectors 40. For example, with an error-sampling interval of four and a data-storage disk 12 having eighty servo sectors 40 per track 42, the described embodiment will require 20 memory-storage locations. The use of an interpolative technique, however, places a somewhat higher calculation burden on the controller 38 than does the non-interpolating technique.

After generating a runout-error correction in the above-noted manner, the interpolating embodiment proceeds in a manner substantially identical to the non-interpolating embodiment, i.e., steps 314 through 322 of FIG. 4 are identical to steps 212 through 220 of FIG. 3.

The second aspect of the invention relates to matching the runout-correction signal to the response characteristics of the actuator mechanism 16. For clarity, this aspect of the invention is addressed separately from the above-described aspect relating to reduced memory requirements for the controller 38. Although the two aspects of the invention are described using separate embodiments, both aspects can readily be combined into a single disk drive 10.

Figure 6:
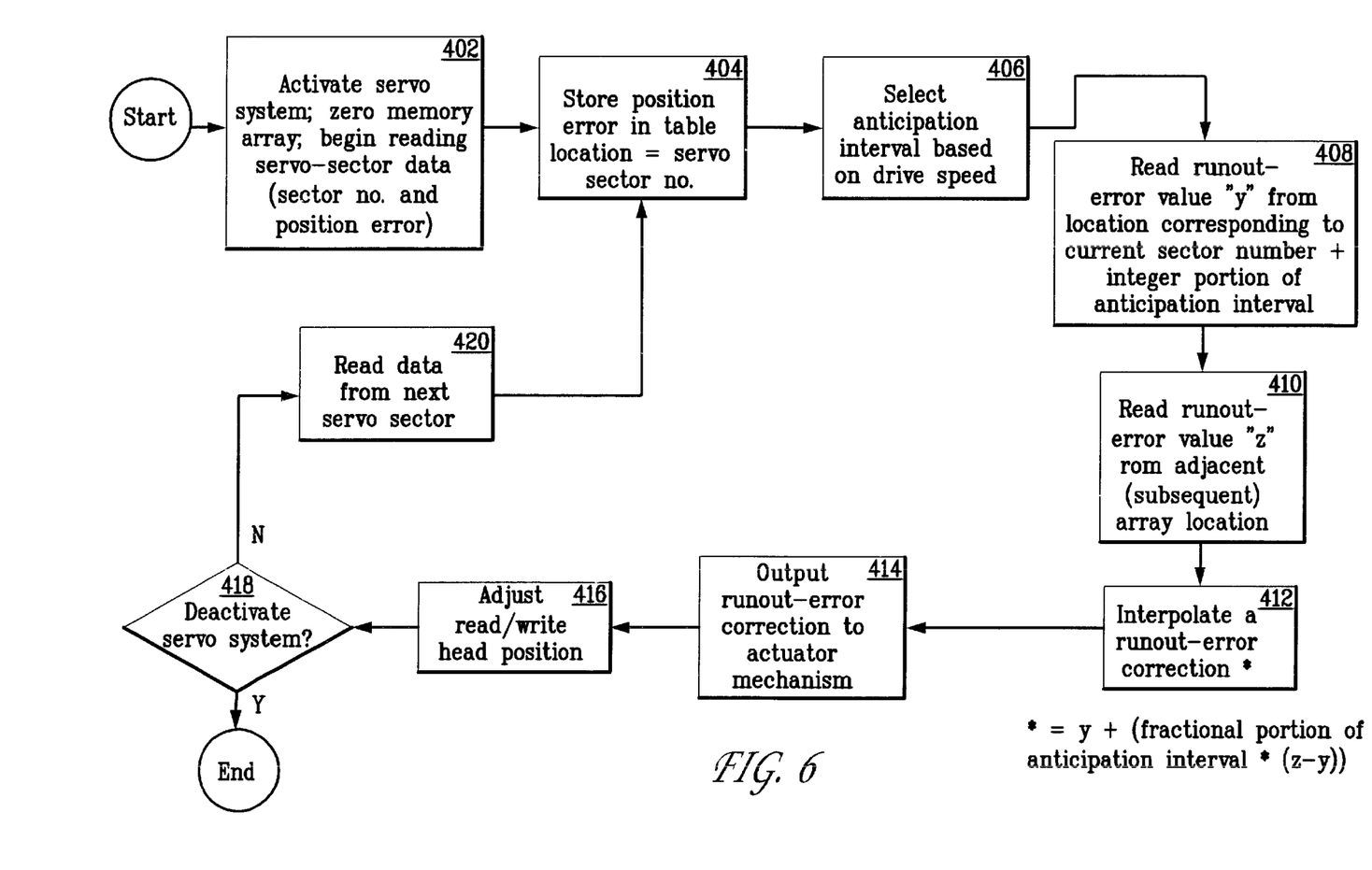
FIG. 6 is a flow diagram of an improved runout-compensation technique for use in the disk drive of FIG. 1.

An embodiment of the second aspect of the invention is illustrated in the form of a flow diagram in FIG. 6. The embodiment of FIG. 6 enhances the ability of the controller 38 to account for the response time of the actuator mechanism 16 by allowing the anticipation interval to be set in non-whole-sector increments. For illustrative purposes, an anticipation interval of three and one-half sectors 40 is utilized for the exemplary embodiment (this anticipation interval thus has an integer portion (three) and a fractional portion (one-half, or 0.5)). Hence, in the exemplary embodiment, the time required for the actuator mechanism 16 to respond to a given control input is conceptualized as corresponding to the passage of three and one-half servo sectors 40 past the read/write head 14.

The embodiment of FIG. 6 is incorporated into the servo controller 38 of the disk drive 10. More particularly, the embodiment is incorporated into the secondary control loop 38b of the controller 38. Upon activation of the controller 38, the read/write head 14 begins reading servo sector data from the servo sectors 40 passing the head 14 (step 402). The data is output to the CPU 26, where the computer-executable instructions 36 store the position-error data in the array 34 (step 404). More specifically, the position-error data from each sector 40 is integrated with the previously-measured error values from that particular sector number, thereby generating a position-error value for that sector 40. The position-error value is stored in a location in the array 34 equal to the current servo-sector number, thereby indexing the stored value to a particular sector number. For clarity, this aspect of the invention is described in connection with an embodiment that processes and stores runout-error data from every sector 40. This aspect of the invention can also be applied to systems which use one of the above-described techniques for implementing a runout correction without processing and storing error data from every sector 40.

The instructions 36 next read a pre-programmed anticipation interval from the memory device 32 (step 406). The drive 10 is a variable-speed drive (although the invention is equally applicable to single-speed drives). The instructions 36 thus select an anticipation interval from the memory device 32 based on the particular speed at which the drive is operating.

Once an appropriate anticipation interval has been chosen, the instructions 36 calculate a runout-error correction based on position-error values stored in the array 34. Specifically, the instructions 36 add the current servo-sector number to the integer portion of the anticipation interval (step 408). The instructions 36 next read a position-error value from a location in the array 34 corresponding to the noted sum. The instructions 36 also read a position-error value from an adjacent, i.e., subsequent, location in the array 34 (step 410). For example, with a current servo-sector number of 15 and an anticipation interval of three and one-half sectors, the instructions 36 read the position-error values from array locations 18 and 19.

The instructions 36 next calculate a runout-error correction based on the position-error values obtained from the array 34 (step 412). More particularly, the instructions 36 interpolate a runout-error correction based on the noted position-error values and the fractional portion of the anticipation interval. Continuing with the preceding example, the instructions 36 multiply the difference between the position-error values for sectors 19 and 18 by 0.5 (the fractional portion of the anticipation interval), and add the product to the position-error value for sector 18. The calculated runout-error correction is subsequently output to the actuator mechanism 16 (step 414). Owing to the response time of the actuator 16, the physical correction to the position of the head 14 optimally takes place as a point on the data track 42 between sector numbers 18 and 19 passes the head 14 (step 416). The above-noted process is then repeated until the servo system 38 is deactivated (steps 418, 420).

An alternative embodiment of the invention uses digital filtering techniques to generate a runout-error correction. This embodiment incorporates a digital filter that models the actuator mechanism 16. The model accounts for the dynamic characteristics of the actuator 16. Furthermore, the filter accounts for the magnitude of the to-be-applied runout-error correction. Hence, this embodiment provides improved tracking accuracy in relation to drives 10 that anticipate the response time of the actuator 16 by some fixed amount.

Figure 7:
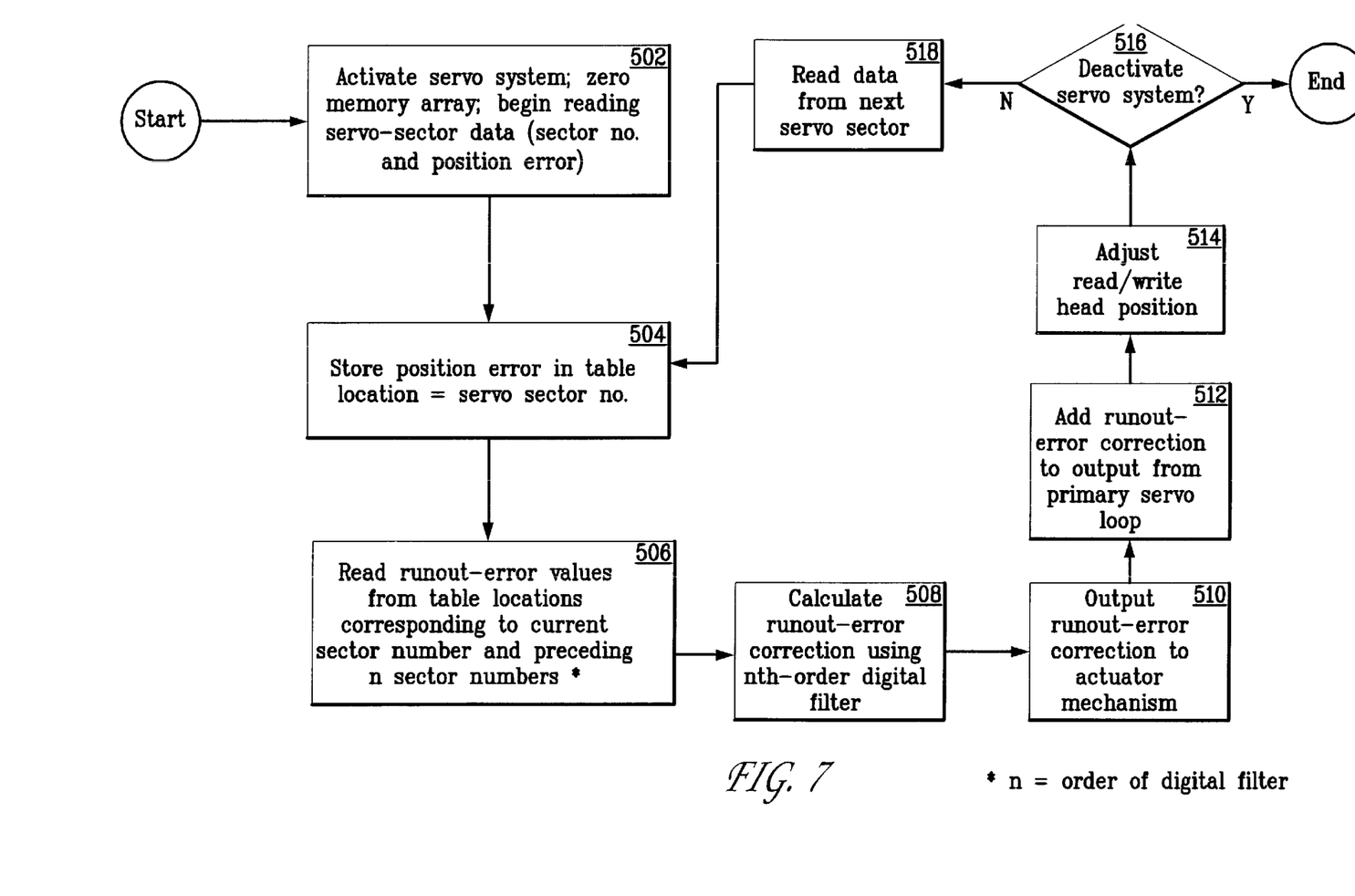
FIG. 7 is a flow diagram of an improved runout-compensation technique for use in the disk drive of FIG. 1.
Figure 8:
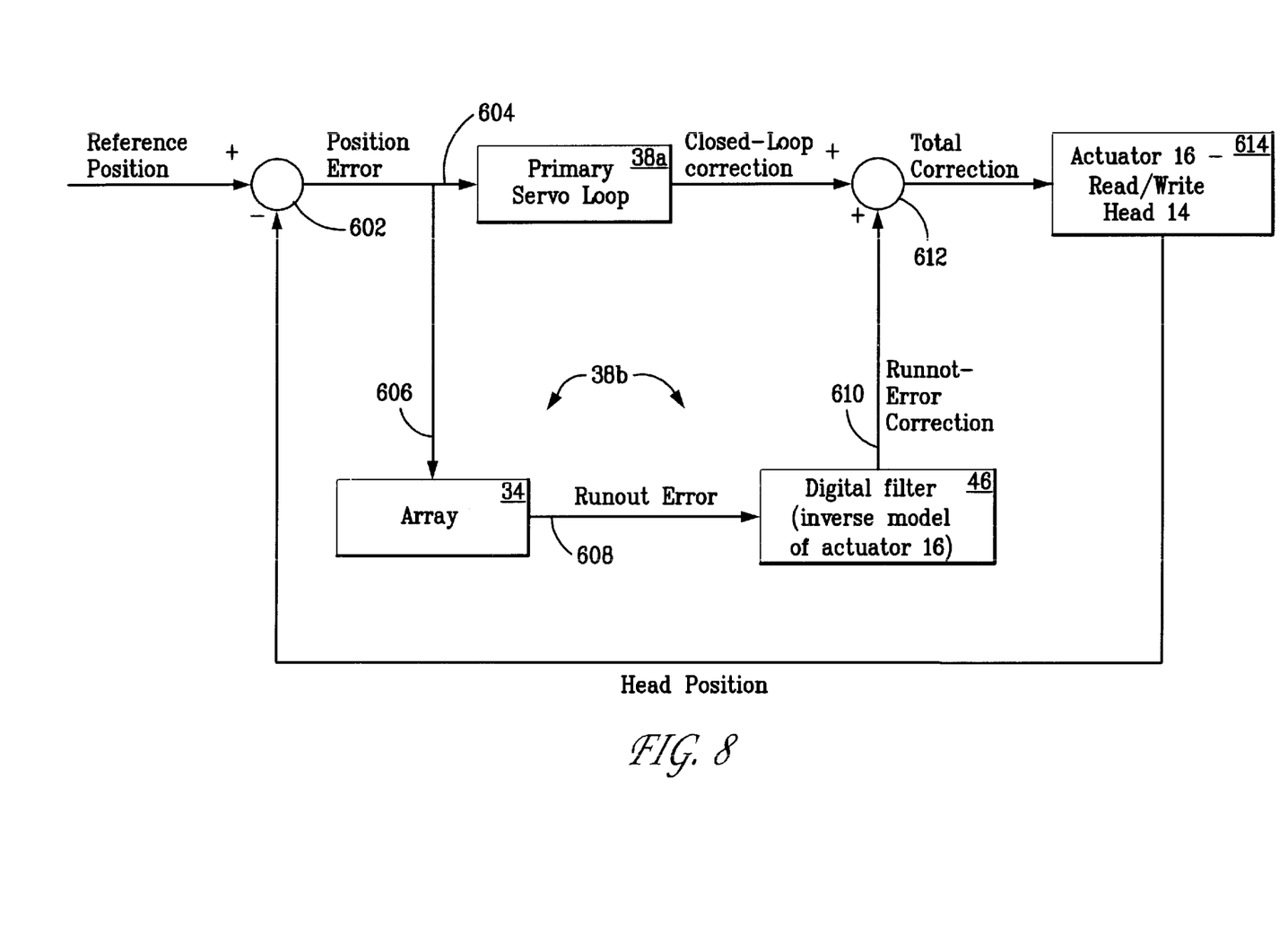
FIG. 8 is a block diagram of the runout-compensation technique of FIG. 7.

A digital filter 46 of virtually any order may be utilized. A second-order filter 46 is preferable for most types of disk drives 10, however, as a filter 46 of this order provides a favorable balance between tracking accuracy and computational simplicity. FIGS. 7 and 8 illustrate an exemplary embodiment that utilizes a second-order digital filter 46. The filter 46 is incorporated into the computer-executable instructions 36. Upon activation of the servo controller 38, the read/write head 14 begins reading the sector number and position-error data from the servo sectors 40 passing the head 14 (step 502). This data is output to the CPU 26, where the computer-executable instructions 36 store the position-error data in the array 34 (step 504). More particularly, the data is integrated with runout-error values previously measured at the same sector number, thereby generating a position-error value for that sector 40. The position-error value is subsequently stored in a location in the array 34 equal to the current servo-sector number, thereby indexing the stored value to a particular sector number.

The instructions 36 next read selected position-error values from the array 34 for input to the digital filter 46 (step 506). For an $n_{th}$-order filter 46, the position-error values for the current sector 40, as well as the preceding n sectors 40 are read from the array 34 and input to the filter 46. Thus, with a second-order filter 46, the position-error values for the current sector 40, as well as the two previous sectors 40, are read from the array 34 and input to the filter 46.

The particular digital filter 46 utilized in the exemplary embodiment is as follows:

$$z^{-c}*(b_0z^{-2}+b_1z^{-1}+b_2)/(a_0z^{-2}+a_1z^{-1}+a_2)=y(z)/u(z),$$

where c, $b_{0-2}$, and $a_{0-2}$ are constants based on the physical characteristics of the actuator mechanism 16, $z^{-1}$ is a unit-delay operator which delays the operand by one sample, or sector number, and k represents a time-unit. An example of the resulting implementable equation with input u, output y, and, for simplicity, c=0, i.e., no delay, is as follows:

$$b_0z^{-2}u(k)+b_1z^{-1}u(k)+b_2u(k)=a_0z^{-2}y(k)+a_1z^{-1}y(k)+a_2y(k)$$

$$b_0u(k-2)+b_1u(k-1)+b_2u(k)=a_0y(k-2)+a_1y(k-1)+a_2y(k)$$

$$y(k)=1/a_2[b_0u(k-2)+b_1{}^{u(k-1)}+b_2u(k)-a_0y(k-2)-a_1y(k-1)$$

The instructions 38 generate a runout-error correction using the above-noted filter 46 (step 508). The correction is subsequently output as a signal to the actuator mechanism 16 (step 510). Before reaching the actuator 16, the runout-correction signal is added to the correction signal generated by the primary servo loop 38a (step 512). The position of the read/write head 16 is subsequently adjusted based on the combined control input (step 514). The above process is then repeated until the servo controller 38 is deactivated (step 516, 518).

The control logic of the above-noted embodiment is illustrated in the form of a block diagram in FIG. 8. As denoted in the figure, a reference position, i.e., the centerline of the data track 42, is subtracted from the actual position of the read/write head 14 (step 602). This operation generates a position error representing the distance between the head 14 and the track centerline. The position error is input to the primary servo loop 38a (step 604). The position error is also processed and stored in the array 34 as described above (step 606).

The controller 38 draws data from a location in the array 34 equal to the current sector number. The controller 38 also draws data from array locations corresponding to the previous the previous n sector numbers. The data is subsequently output to the digital filter 46 (step 608). The filter 46 functions as an inverse model of the actuator mechanism 16. Hence, when supplied with the noted inputs, the filter 46 generates a particular output (step 610). This output equals the correction required to remove the currently-existing runout error from the actuator mechanism 16. Furthermore, the use of a second-order filter 46 causes the output to reflect the dynamic characteristics of the actuator 16. The output of the filter 46 is thus used as a runout-error correction for the current sector 40 (step 216). The runout correction signal is added to a correction signal generated by the closed-loop portion of the controller 38 (step 612). The combined correction signal is subsequently input to the actuator mechanism 16 (step 614).

In light of the above discussion, one skilled in the art will recognize numerous advantages provided by the present invention. For example, the disclosed techniques for more closely matching the runout-compensation signal to the response characteristics of the actuator mechanism 16 reduces the overall tracking error of the read/write head 14. A reduction in the head-tracking error is particularly valuable in contemporary disk drives 10, as such reductions allow a closer spacing of the data tracks 42 on the disk 12. Closer spacing of the tracks 42, in turn, increases the amount of data that can be stored within a given area on the data disk 12. This increase can be exploited to increase the overall data-storage capacity of the disk 12. Furthermore, increased data-storage capacity per unit area allows a reduction in the size of the data-storage disk 12. This reduction, in turn, can lead to decreases in the form factor of the drive 10.

In addition, increased tracking accuracy generally reduces the occurrence of errors associated with the storage and retrieval of data to and from the disk 10. A further advantage of increased tracking accuracy is reduced wear on the various components of the actuator mechanism 16. This reduction stems from a decrease in the movement of the actuator 16. Such a decrease typically accompanies improved tracking accuracy.

The invention also provides a runout-error correction that requires less memory space than current techniques. Reductions in memory-requirements are also of particular value in contemporary disk drives 10 due to consumer-driven pressures to decrease the cost, form factor, and data-access times of disk drives such as the drive 10. Decreases in each of these areas can be achieved through reduced memory requirements. Furthermore, the invention allows the memory requirements of the controller 40 to be balance against the degree of accuracy with which the tracking of the head 14 is to be regulated. Hence, these factors can be optimized to meet the specific needs of a particular drive design. Furthermore, the invention achieves the above-noted advantages with no additional hardware in relation to typical servo controllers.

It is to be understood that even though numerous characteristics and advantages of the present invention have been set forth in the foregoing description, together with details of the structure and function of the invention, the disclosure is illustrative only, and changes may be made in detail, especially in matters of shape, size, and arrangement of the parts, within the principles of the invention to the full extent indicated by the broad general meaning of the terms in which the appended claims are expressed.

What is claimed is:

1. A method for compensating for repeatable runout between a data disk rotatably disposed in a disk drive and a data-transducing head of the drive, the drive being adapted to operate with an anticipation interval having an integer portion and a fractional portion, the method comprising the steps of:

reading position-error data and a servo-sector number from a first servo sector embedded in a data track on the disk;

storing and indexing the position-error data in a first location in a memory array;

reading the position-error data from a second location in the array, the second location corresponding to the servo-sector number of the first servo sector plus the integer portion of the anticipation interval;

reading the position-error data from a third location in the array, the third location being adjacent to the second location;

interpolating a runout-error correction based on the position-error data from the second and third array locations and the fractional portion of the anticipation interval; and adjusting a position of an actuator mechanism coupled to the data-transducing head based on the runout-error correction.

2. A memory device bearing computer executable instructions for instructing a central processing unit to carry out the steps recited in claim 1.

3. A disk drive for use with a rotatable data disk having a plurality of servo sectors embedded along a data track on the disk, the drive being adapted to operate with an anticipation interval having an integer portion and a fractional portion, the drive comprising:

an actuator mechanism;

a data-transducing head mechanically coupled to the actuator mechanism, the data-transducing head reading position-error data and a servo-sector number from the servo sectors; and a servo controller electrically coupled to the data-transducing head and the actuator mechanism, the servo controller comprising a memory array, the servo controller storing and indexing the position-error data from a first servo sector in a first location in the memory array, the servo controller reading the position-error data from a second location in the array, the second location corresponding to the servo-sector number of the first servo sector plus the integer portion of the anticipation interval, the servo controller reading the position-error data from a third location in the array, the third location being adjacent to the second location, the servo controller interpolating a runout-error correction based on the position-error data from the second and third array locations and the fractional portion of the anticipation interval, and the servo controller adjusting a position of the actuator mechanism based on the runout-error correction, whereby the controller compensates for repeatable runout between the data-transducing head and the disk.

4. The disk drive of claim 3, wherein the actuator mechanism comprises an actuator motor, an actuator arm coupled to the motor, a suspension arm coupled to the actuator arm, a flexure coupled to the suspension arm, and a gimbal coupled to the flexure.

5. The disk drive of claim 3, wherein the servo controller comprises a central processing unit.

6. A method for compensating for repeatable runout between a data disk rotatably disposed in a disk drive having an $n_{th}$-order digital filter, and a data-transducing head of the drive, comprising the steps of:

reading position-error data and a servo-sector number from a first servo sector embedded in a data track on the disk;

storing and indexing the position-error data in a first location in a memory array;

reading the position-error data from locations in the array corresponding to:
   the first servo sector;
   a second servo sector having the sector number equal to the sector number of the first servo sector minus n; and
   servo sectors having the sector numbers between the sector numbers of the first and second sectors;

inputting the position-error data from the array to the digital filter;

calculating a runout-error correction using the $n_{th}$-order digital filter; and adjusting a position of an actuator mechanism coupled to the data-transducing head based on the runout-error correction.

7. The method of claim 6, wherein the digital filter is a second-order filter.

8. A memory device bearing computer executable instructions for instructing a central processing unit to carry out the steps recited in claim 6.

9. A disk drive for use with a rotatable data disk having a plurality of servo sectors embedded along a data track on the disk, comprising:

an actuator mechanism;

a data-transducing head mechanically coupled to the actuator mechanism, the data-transducing head reading position-error data and a servo-sector number from the servo sectors; and a servo controller electrically coupled to the data-transducing head and the actuator mechanism, the servo controller comprising a memory array bearing a set of computer-executable instructions, the instructions comprising an $n_{th}$-order digital filter, the servo controller storing and indexing the position-error data from a first servo sector in a first location in the memory array, the servo controller reading the position-error data from locations in the array corresponding to the first servo sector, a second servo sector having the sector number equal to the sector number of the first servo sector minus n, and servo sectors having the sector numbers between the sector numbers of the first and second sectors, the servo controller inputting the position-error data from the array to the digital filter, the servo controller calculating a runout-error correction using the digital filter, and the servo controller adjusting a position of the actuator mechanism based on the runout-error correction, whereby the controller compensates for repeatable runout between the data-transducing head and the disk.

10. The disk drive of claim 9, wherein the digital filter is a second-order filter.

11. The disk drive of claim 9, wherein the actuator mechanism comprises an actuator motor, an actuator arm coupled to the motor, a suspension arm coupled to the actuator arm, a flexure coupled to the suspension arm, and a gimbal coupled to the flexure.

12. The disk drive of claim 9 wherein the servo controller comprises a central processing unit.

* * * * *

UNITED STATES PATENT AND TRADEMARK OFFICE
CERTIFICATE OF CORRECTION

PATENT NO. : 6,504,668 B1 Page 1 of 1
DATED : January 7, 2003
INVENTOR(S) : Kenji Takeuchi et al.

It is certified that error appears in the above-identified patent and that said Letters Patent is hereby corrected as shown below:

Column 9,
Line 29, "iterpolative" should be -- interpolative --.

Signed and Sealed this

Twenty-fifth Day of May, 2004

JON W. DUDAS
*Acting Director of the United States Patent and Trademark Office*